United States Patent [19]

Sadamatsu et al.

[11] Patent Number: 5,262,862
[45] Date of Patent: Nov. 16, 1993

[54] BLACK LEVEL COMPENSATION CIRCUIT FOR A LUMINANCE SIGNAL

[75] Inventors: Hideaki Sadamatsu; Atsuhisa Kageyama, both of Osaka, Japan

[73] Assignee: Matsushita Electric Industrial Co., Ltd., Osaka, Japan

[21] Appl. No.: 732,000

[22] Filed: Jul. 18, 1991

[30] Foreign Application Priority Data

Jul. 19, 1990 [JP] Japan .................... 2-189470

[51] Int. Cl.$^5$ .............................. H04N 5/57
[52] U.S. Cl. ............................ 358/168; 358/169
[58] Field of Search .................... 358/168–172, 358/39, 174

[56] References Cited

U.S. PATENT DOCUMENTS

| | | | |
|---|---|---|---|
| 4,204,229 | 5/1980 | Heuze. | |
| 4,631,589 | 12/1986 | Hongu et al. | 358/171 |
| 4,937,671 | 6/1990 | Engel | 358/169 |
| 4,975,773 | 12/1990 | Rabii | 358/168 X |
| 5,087,967 | 2/1992 | Matsumoto et al. | 358/39 X |

FOREIGN PATENT DOCUMENTS 2606956 5/1988 France.

Primary Examiner—Victor R. Kostak
Attorney, Agent, or Firm—Pollock, VandeSande & Priddy

[57] ABSTRACT

A black compensation circuit for compensating a luminance signal which is subjected to edge enhancement, comprises: a black-level expanding circuit responsive to a control signal including an edge enhancement component and the luminance signal for performing expansion of a tone of a black portion of the luminance signal and for performing conversion of the luminance signal into a black-level expanded signal in the absence of the control signal; a low-pass filter circuit for low-pass filtering the luminance signal to remove the edge enhancement component; a detection circuit responsive to an output of the low-pass filter circuit for detecting the blackest level for a given interval; and a comparing circuit for comparing the blackest level with a given level to produce the control signal, the black-level expanding circuit stopping the expansion and the conversion in the presence of the control signal. The blackest level does not change with sharpness because after the luminance signal subjected to edge enhancement is passed through the low-pass filter, it is sent to the detection circuit. An input signal of the low-pass filter may be supplied from the black-level expanding circuit.

3 Claims, 4 Drawing Sheets

BLACK LEVEL COMPENSATION CIRCUIT FOR A LUMINANCE SIGNAL

BACKGROUND OF THE INVENTION

1. Field of the Invention

This invention relates to a black level compensation circuit for compensating a luminance signal.

2. Description of the Prior Art

A prior art black level compensation circuit performs black compensation as follows:

It expands a tone of a black portion of a luminance signal in the absence of a control signal to provide a crisp picture image. A black level detection circuit detects the blackest level for a given interval. If the detected blackest level is larger than a given value, the detection circuit produces the control signal to stop the black-level expansion. Such circuit is shown in FIG. 3.

Hereinbelow will be described such prior art black compensation circuit with reference to FIG. 3.

A luminance signal 101 is subjected to edge enhancement and amplification by a sharpness circuit 102 and a contrast circuit 103 respectively. Then, it is applied to a black level detection circuit 104 and a pedestal clamp circuit 105. The output signal from the pedestal clamp circuit 105 is applied to a black expansion circuit 106. The black level detection circuit 104 detects the blackest level for a given interval and is compared with a given reference level obtained from a pedestal level signal. If the blackest level is larger than the given reference level, the black level expansion circuit 106 does not perform the black-level expansion.

This black level detection circuit 104 will be described more specifically.

The luminance signal passing through the contrast circuit 103 (a negative signal) is fed to a differential amplifier having transistors 113 and 107. The transistors 108 and 109 controls the differential amplifier having transistors 113 and 107 to operate it for only a period that the luminance signal is received, i.e., scanning period. For a blanking period, a current source including a transistor 131 and a resistor 132 do not supply a current. When a potential of the input signal of the black level detection circuit 104 is higher than the base potential of the transistor 107, the transistor 113 turns on. Then, a current Miller circuit including a transistor 114 and a resistor 115 and another current Miller circuit including a transistor 117 and a resistor 116 allow to flow a current to charge a capacitor 112. That is, a maximum potential of the input signal of the black level detection circuit 104 is maintained at a base of the transistor 107. A resistor 118 determines a time constant for maintaining the maximum potential. A differential amplifier including transistor 135, resistors 136 and 137, and a transistor 138 compares the maximum potential of the black level with a pedestal level as the given reference level. The black expansion circuit 106 expands a tone of black portions of the luminance signal to the pedestal level when the maximum potential is lower than the pedestal level. When the maximum potential is not lower than the pedestal level, the black expansion circuit 106 stops this black level expansion. In the circuit, sets of resistors 123 and 125 and a transistor 124; a transistor 126 and a resistor 127; a resistor 128 and a transistor 134; a transistor 129 and a resistor 130; a transistor 131 and a resistor 132 comprise constant current sources respectively.

However, there is a drawback that the operation of the black compensation circuit changes with the sharpness signal.

The luminance signal inputted to the black level detection circuit 104 from the contrast circuit 103 is subjected to edge enhancement by the sharpness circuit 102 such that at an edge where the luminance signal indicating a shadow level is compensated to show more shadow. FIG. 4 shows the luminance signal subjected to edge enhancement. In FIG. 4, an original black level Vbo is changed to Vb1 in level at an edge portion by the sharpness circuit 102. As the result, the detected blackest level changes with edge enhancement. That is, black compensation changes with sharpness signal.

SUMMARY OF THE INVENTION

The present invention has been developed in order to remove the above-described drawbacks inherent to the conventional black level compensation circuit.

According to the present invention there is provided a black compensation circuit for compensating a luminance signal, comprising: a black-level expanding circuit responsive to a control signal and the luminance signal for performing expansion of a tone of a black portion of the luminance signal and for performing conversion of the luminance signal into a black-level expanded signal in the absence of the control signal; a low-pass filter circuit for low-pass filtering the luminance signal to remove high frequency components; a detection circuit responsive to an output of the low-pass filter circuit for detecting the blackest level for a given interval; and a comparing circuit for comparing the blackest level with a given level to produce the control signal, thereby the black-level expanding circuit stopping the expansion and the conversion in the presence of the control signal.

According to the present invention there is also provided a black compensation circuit for compensating a luminance signal, comprising: a black-level expanding circuit responsive to a control signal and the luminance signal for performing expansion of a tone of a black portion of the luminance signal and for performing conversion of the luminance signal into a black-level expanded signal in the absence of the control signal; a low-pass filter circuit for low-pass filtering the output signal of the black-level expanding circuit to remove high frequency components; a detection circuit responsive to an output of the low-pass filter circuit for detecting the blackest level for a given interval; and a comparing circuit for comparing the blackest level with a given level to produce the control signal, thereby the black-level expanding circuit stopping the expansion and the conversion in the presence of the control signal.

The blackest level does not change with sharpness because the luminance signal subjected to edge enhancement is passed through the low-pass filter, then, it is sent to the detection circuit.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention.

Figure 1:
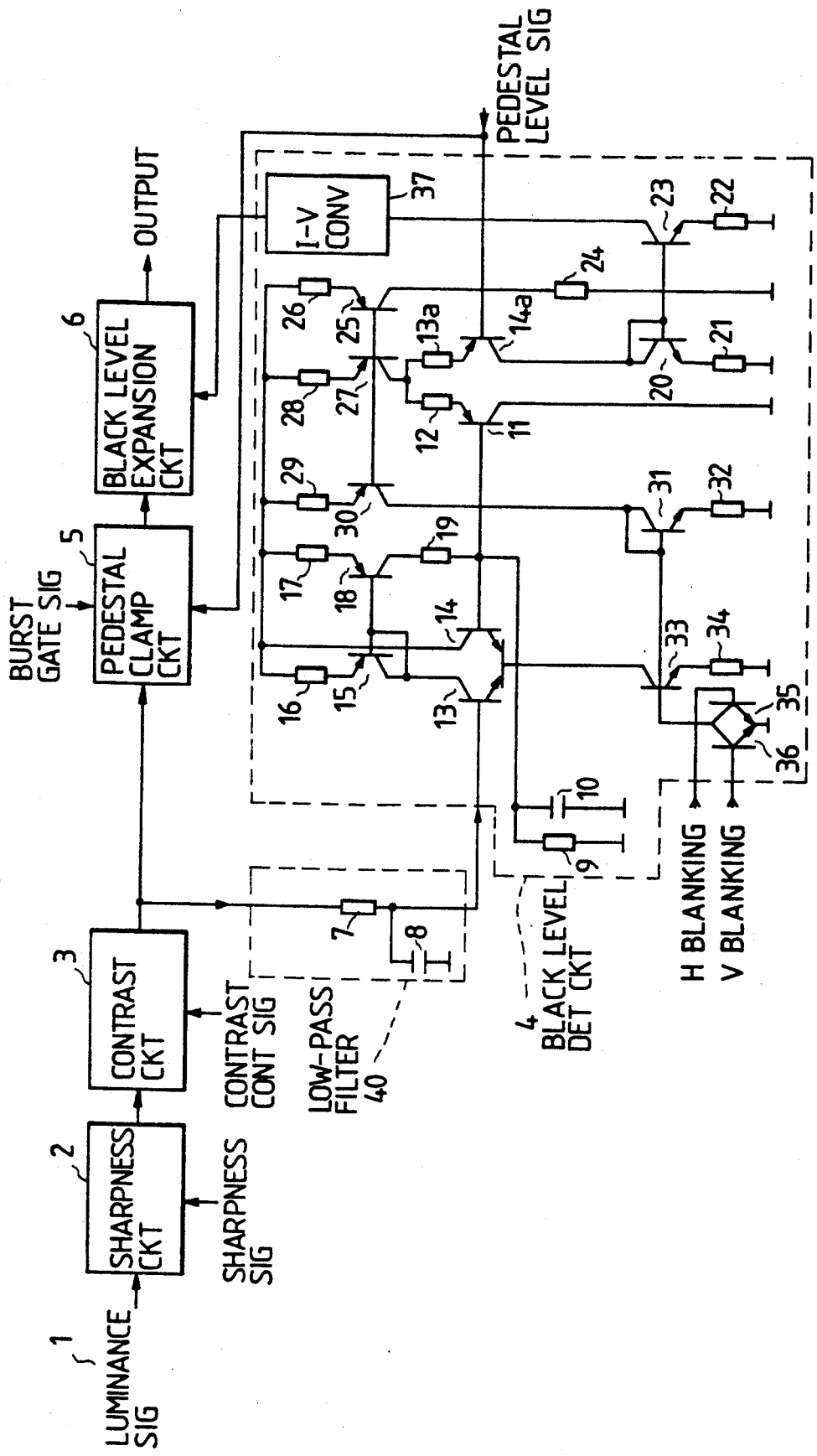
FIG. 1 is a schematic circuit diagram of a first embodiment of the invention of a black compensation circuit.

FIG. 1 is a schematic circuit diagram of the first embodiment of a black level compensation circuit of the invention. In FIG. 1, a luminance signal 1 is applied to a sharpness circuit 2. An output of the sharpness circuit 2 is sent to a contrast circuit 3. An output of the contrast circuit 3 is fed to a low-pass filter 40 and a pedestal clamp circuit 5. An output of the pedestal clamp circuit 5 is sent to a black level expansion circuit 6. The sharpness circuit 2 performs edge enhancement to improve picture quality. Then, the contrast circuit 3 controls an amplitude of the luminance signal to a given range. The pedestal clamp circuit 5 determines brightness of the output of the contrast circuit 3 and sends it to the black level expansion circuit 6. The output of the contrast circuit 3 sent to a low-pass filter 40 of 1-2 MHz comprises a resistor 7 and a capacitor 8 to remove high frequency components to decrease the affection of edge enhancement. An output of the low-pass filter 40 is sent to the black level detection circuit 4.

The black level detection circuit 4 detects the blackest level for a given interval and is compared with a pedestal level signal as a given reference level. If the blackest level is larger than the given reference level, the black level expansion circuit 6 does not perform the black-level expansion. That is, if the luminance signal is of a short range signal, the black-level expansion is carried out. On the other hand, if the luminance signal is of a long range signal, the black-level expansion is stopped.

This black level detection circuit 4 will be described more specifically.

Figure 2:
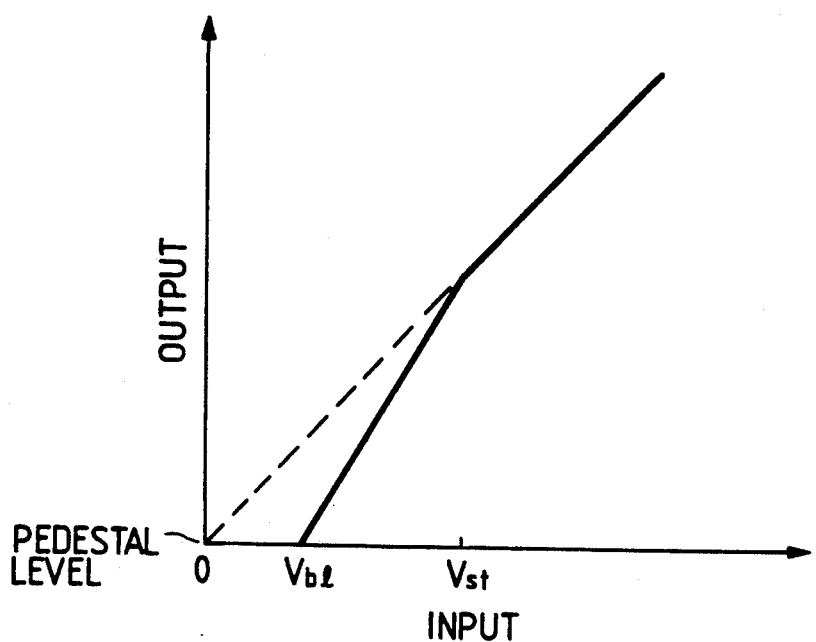
FIG. 2 shows a relation between input and output of the black expansion circuit of the first embodiment.
Figure 4:
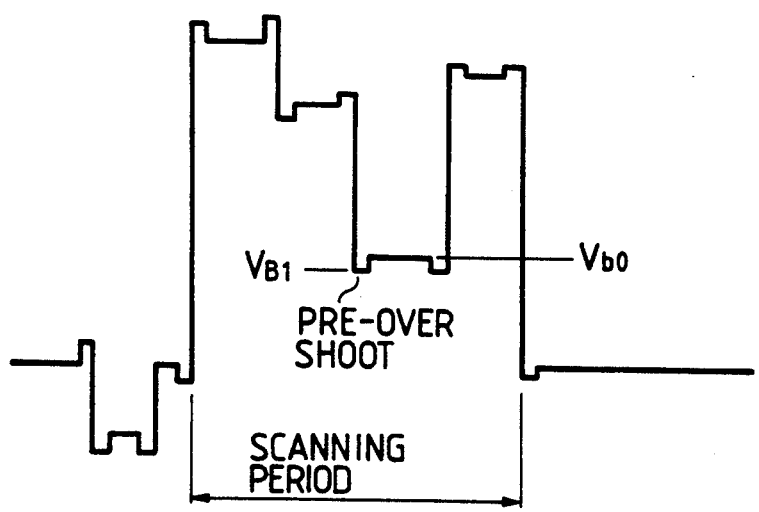
FIG. 4 shows the luminance signal subjected to edge enhancement of the prior art.
Figure 3:
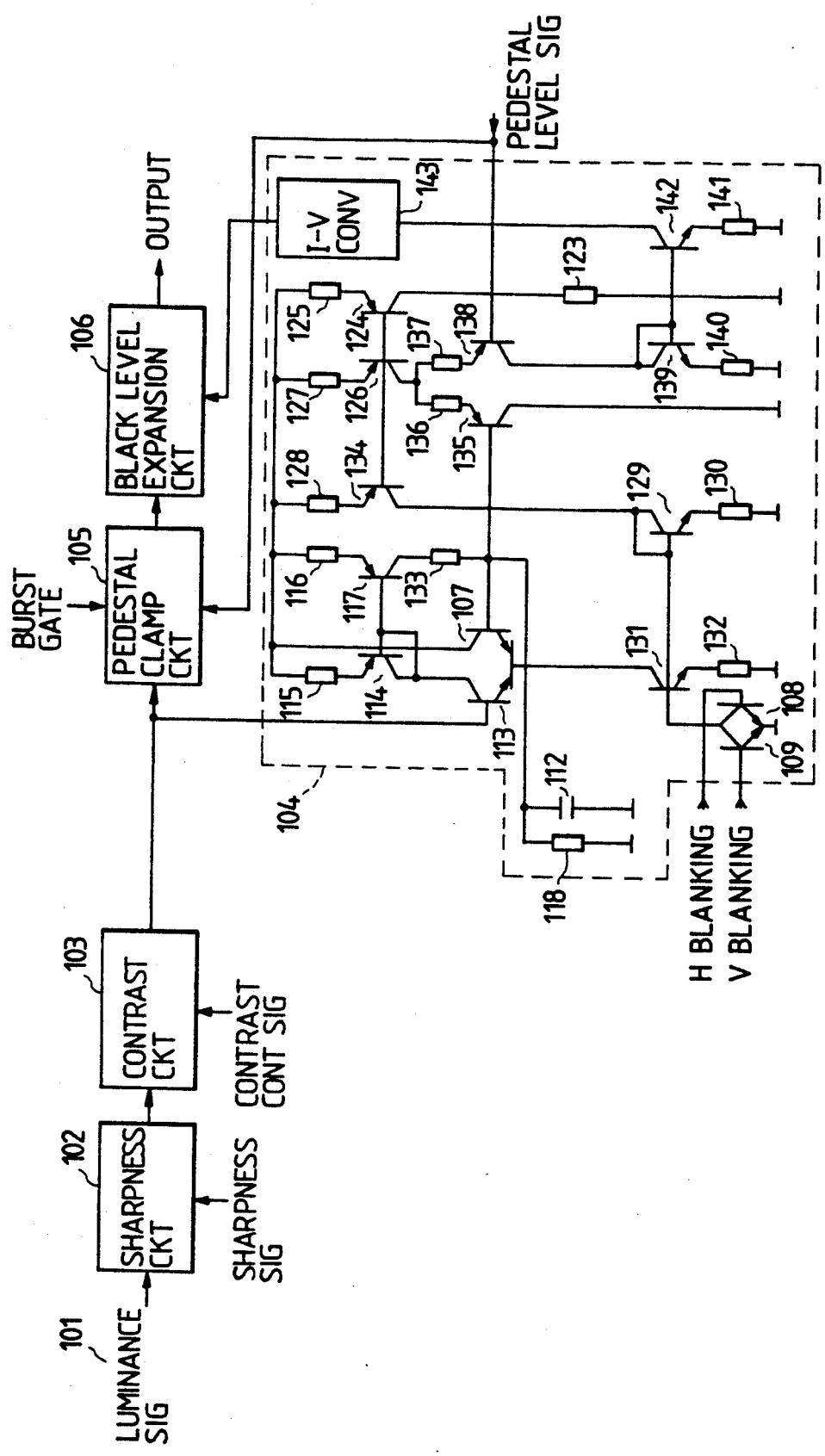
FIG. 3 is a prior art black compensation circuit.

The signal passing through the contrast circuit 3 (a negative signal) is fed through the low-pass filter 40 to a differential amplifier having transistors 13 and 14. The transistors 35 and 36 controls the differential amplifier having transistors 13 and 14 to operate it for only the period that the luminance signal is received, i.e., scanning period. For a blanking period, a current source including a transistor 31 and a resistor 32 do not supply a current. When a potential of the input signal of the black level detection circuit 4 is higher than the base potential of the transistor 14, the transistor 13 turns on. Then, a current Miller circuit including a transistor 15 and a transistor 18, and a resistor 17 allow to flow a current which charges a capacitor 10. That is, a maximum potential, i.e., the blackest level of the input signal is maintained at a base of the transistor 14. A resistor 9 connected to the capacitor 10 in parallel determines a time constant for maintaining the maximum potential as a given interval. A differential amplifier including a transistor 11, resistors 12 and 13a, and a transistor 14a compares the maximum potential level of the black level with a pedestal level, which acts as a comparator. An output of the differential amplifier including a transistor 11, resistors 12 and 13a is sent to the black level expansion circuit 6 through I-V converter for converting a current of the output signal from this differential amplifier into a voltage output. The black level expansion circuit 6 expands a tone of a black portion of the luminance signal and converts the luminance signal into black-level expanded signal when the maximum potential is lower than the pedestal level as a given reference level. When it is larger than the given reference level expansion circuit 6 stops this black level expansion. FIG. 2 shows a relation between input and output of the black of the expansion circuit 6. Between input levels Vst and Vbl a characteristic curve of the output of the black level expansion circuit 6 is bent to compression of the range in the presence of the control signal from the comparing circuit. In the absence of the control signal, the black level expansion circuit expands its output range as shown by the solid line in FIG. 2. As the result, black portions in reproduced picture image are compensated to be more dark, so that the crisp picture is obtained. In this case, a stable black level can be obtained because a change of the input signal by a sharpness circuit is removed by the low-pass filter 40.

Resistors 24 and 26 and a transistor 25; a transistor 27 and a resistor 28; a resistor 29 and transistor 30; a transistor 31 and a resistor 32; and a transistor 33 and a resistor 34 are constant current sources respectively. H blanking signal is applied to the transistor 35. V blanking signal is fed to a transistor 36. In the circuit, numerals 15 to 37 operate in the same way as elements 108, 109, 114-117, 123-134, and 139-143 of the prior art.

In addition to this, when the received signal is weak, for example, radio waves are received at a remote area, the input luminance signal 1 may include a large amount of noise component. However, the low-pass filter reduces the noise component and provides a stable black compensation.

Hereinbelow will be described a second embodiment of this invention.

Figure 5:
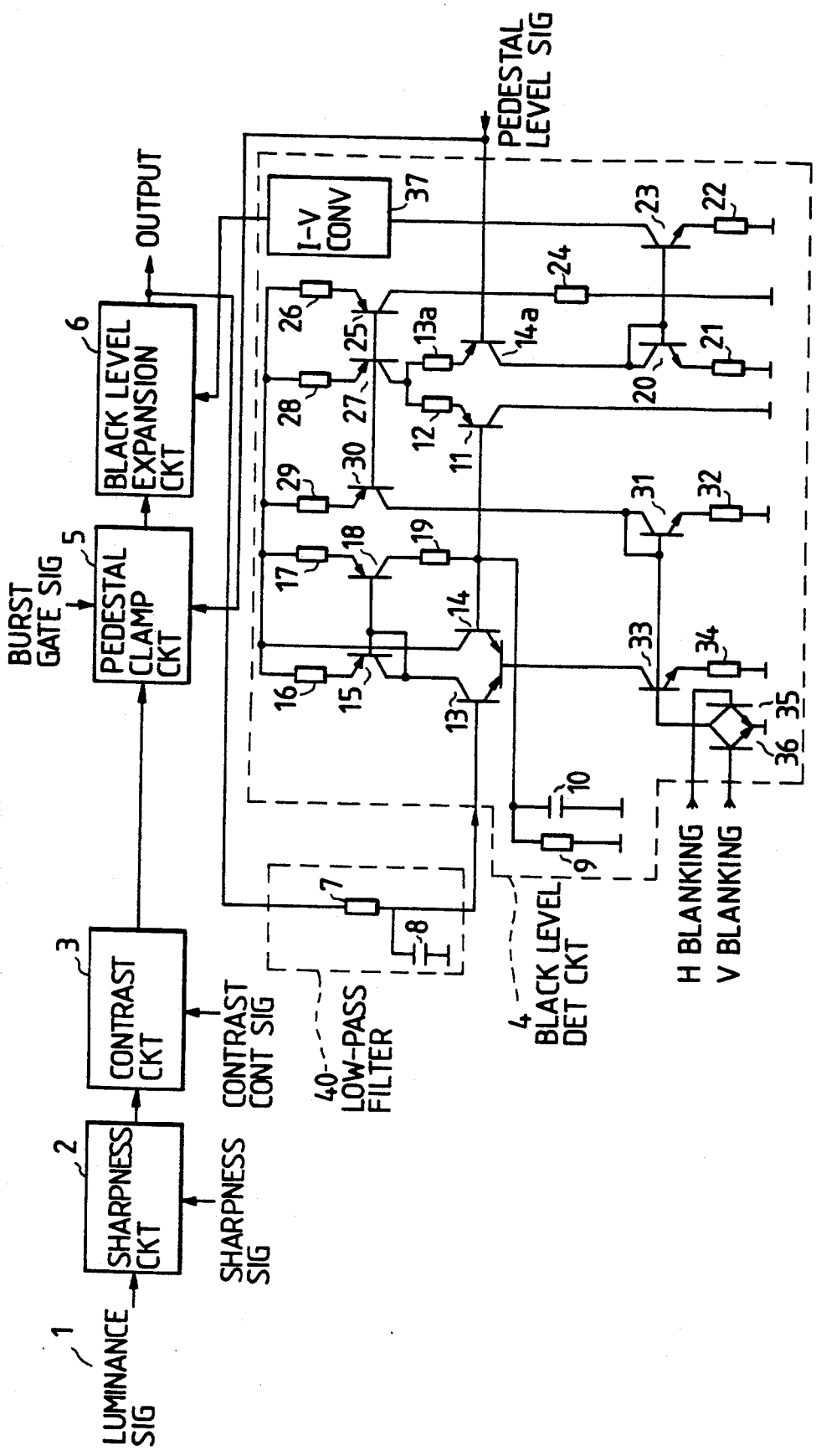
FIG. 5 is a schematic circuit diagram of a second embodiment of the invention of a black compensation circuit.

FIG. 5 is a schematic circuit diagram of the second embodiment of a black level compensation circuit of the invention. In FIG. 5, a luminance signal 1 is applied to a sharpness circuit 2. An output of the sharpness circuit 2 is sent to a contrast circuit 3. An output of the contrast circuit 3 is fed to a pedestal clamp circuit 5. An output of the pedestal clamp circuit 5 is sent to a black level expansion circuit 6. The sharpness circuit 2 performs edge enhancement to improve picture quality. Then, the contrast circuit 3 controls an amplitude of the luminance signal to a given range. The pedestal clamp circuit 5 determines brightness of the output of the contrast circuit 3 and sends it to the black level expansion circuit 6. The output of the black level expansion circuit 6 sent to a low-pass filter 40 of 1-2 MHz comprises a resistor 7 and a capacitor 8 to remove high frequency components to decrease the effects of edge enhancement. An output of the low-pass filter 40 is sent to the black level detection circuit 4.

The black level detection circuit 4 detects the blackest level for a given interval and is compared with a pedestal level signal as a given reference level. If the blackest level is larger than the given reference level, the black level expansion circuit 6 does not perform the black-level expansion. That is, if the luminance signal is of a short range signal, the black-level expansion is carried out. On the other hand, if the luminance signal is of a long range signal, the black-level expansion is stopped.

Operation of the black-level expansion circuit is the same as that of the first embodiment, so that its detailed description is omitted.

As mentioned above, in the absence of the control signal from the black level detection circuit 4, the black level expansion circuit 6 expands its output range. As the result, black portions in reproduced picture image are compensated to be more dark, so that the crisp picture is obtained. In this case, a stable black level can be obtained because a change of the input signal by the sharpness circuit is removed by the low-pass filter 40.

What is claimed is:

1. A black compensation circuit for compensating a luminance signal, comprising:
   (a) black-level expanding means responsive to a control signal and said luminance signal for performing expansion of a tone of a black portion of said luminance signal and for performing conversion of said luminance signal into a black-level expanded signal in the absence of said control signal;
   (b) low-pass filter means for low-pass filtering an output signal of the black-level expanding means;
   (c) detection means responsive to an output of said low-pass filter means for detecting the blackest level for a given interval; and
   (d) comparing means for comparing the blackest level with a given level to produce said control signal, thereby said black-level expanding means stopping said expansion and said conversion in the presence of said control signal.

2. A black compensation circuit for compensating a luminance signal, comprising:
   (a) a sharpness control means adding an edge enhancement component to the luminance signal for enhancing an edge of the luminance signal in accordance with a sharpness control signal;
   (b) black-level expanding means responsive to a control signal and said luminance signal for performing expansion of a tone of a black portion of said luminance signal and for performing conversion of said luminance signal into a black-level expanded signal in the absence of said control signal;
   (c) low-pass filter means for low-pass filtering said luminance signal and said edge enhancement component added to said luminance signal to remove said edge enhancement signal;
   (d) detection means for detecting the blackest level by comparing an output of said low pass filter with a maintained blackest level;
   (e) level maintaining means for maintaining the detected blackest level, to produce said maintained blackest level, such that the detected blackest level changes toward the high light level in accordance with a predetermined continuous increasing function; and
   (f) comparing means for comparing the blackest level with a given level to produce said control signal, said black-level expanding means stopping said expansion and said conversion in the presence of said control signal.

3. In a black compensation circuit for compensating a luminance signal, having a sharpness control means adding an edge enhancement component to the luminance signal for enhancing an edge of the luminance signal in accordance with a sharpness control signal; black-level expanding means responsive to a control signal and said luminance signal for performing expansion of a tone of a black portion of said luminance signal and for performing conversion of said luminance signal into a expanded signal in the absence of said control signal; detection means responsive to said luminance signal for detecting the blackest level by comparing said luminance signal with a maintained blackest level; level maintaining means for maintaining the detected blackest level to produce said maintained blackest level such that the detected blackest level changes toward the high light level in accordance with a predetermined continuous increasing function; and comparing means for comparing the blackest level with a given level to produce said control signal, said black-level expanding means stopping said expansion and said conversion in the presence of said control signal, the improvement comprising:

low-pass filter means for low-pass filtering said luminance signal and said edge enhancement component added to said luminance signal to remove said edge enhancement component from said luminance signal and supplying its output to said detection means.

* * * * *